United States Patent
Moon et al.

(10) Patent No.: US 8,179,643 B2
(45) Date of Patent: May 15, 2012

(54) ELECTROSTATIC DISCHARGE CIRCUIT AND LIQUID CRYSTAL DISPLAY DEVICE HAVING THE SAME

(75) Inventors: Su Hwan Moon, Gyeongsangbuk-do (KR); Do Heon Kim, Busan-si (KR); Chung Wan Oh, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 352 days.

(21) Appl. No.: 11/640,903

(22) Filed: Dec. 19, 2006

(65) Prior Publication Data

US 2008/0002319 A1    Jan. 3, 2008

(30) Foreign Application Priority Data

Jun. 29, 2006  (KR) .................. 10-2006-0059216

(51) Int. Cl.
*H02H 9/00* (2006.01)
(52) U.S. Cl. ........................................ 361/56
(58) Field of Classification Search .............. 361/56
See application file for complete search history.

(56) References Cited

U.S. PATENT DOCUMENTS

| | | | |
|---|---|---|---|
| 5,714,900 A * | 2/1998 | Ehlers ........................... | 327/325 |
| 5,892,717 A * | 4/1999 | Malarsie .................. | 365/189.06 |
| 5,929,690 A * | 7/1999 | Williams ....................... | 327/374 |
| 6,040,968 A * | 3/2000 | Duvvury et al. ................ | 361/56 |
| 6,985,035 B1 * | 1/2006 | Khorramabadi .............. | 330/253 |
| 7,009,199 B2 * | 3/2006 | Hall ................................. | 257/14 |
| 7,009,831 B2 * | 3/2006 | Walters ......................... | 361/111 |
| 7,064,353 B2 * | 6/2006 | Bhat ............................... | 257/79 |
| 7,084,486 B2 * | 8/2006 | Walters ........................ | 257/656 |
| 7,164,568 B2 * | 1/2007 | Walters ......................... | 361/111 |
| 7,375,724 B2 * | 5/2008 | Jiang et al. .................... | 345/204 |
| 7,453,470 B1 * | 11/2008 | Brunner ....................... | 345/615 |

FOREIGN PATENT DOCUMENTS

WO  WO 2004072941  *  8/2004

OTHER PUBLICATIONS

NN78033962, Mar. 1978, IBM Tech Discl. Bulletin.*

* cited by examiner

*Primary Examiner* — Ronald W Leja
(74) *Attorney, Agent, or Firm* — Morgan, Lewis & Bockius LLP (57) ABSTRACT

An electrostatic discharge circuit includes a first transistor and a second transistor connected between a first node and a second node in a first circulation loop, and a third transistor and a fourth transistor connected between the second node and a third node in a second circulation loop.

28 Claims, 7 Drawing Sheets

FIG. 1

(RELATED ART)

ELECTROSTATIC DISCHARGE CIRCUIT AND LIQUID CRYSTAL DISPLAY DEVICE HAVING THE SAME

This invention claims the benefit of Korean Patent Application No. 2006-0059216 filed in Korea on Jun. 29, 2006, which is hereby incorporated by reference in its entirety.

BACKGROUND OF THE INVENTION

1. Field of the Invention

Embodiments of the invention relate to a display device, and more particularly to an electrostatic discharge circuit and a liquid crystal display device having the same. Although embodiments of the invention are suitable for a wide scope of applications, they are particularly suitable for reducing power consumption and improving image quality.

2. Description of the Related Art

As information-oriented society develops, the demands for display devices increase. To meet such demands, a variety of display devices, such as LCD devices, plasma display panels (PDPs), and electro luminescent displays (ELDs), have been developed. Among these display devices, the LCD devices have the advantages of excellent image quality, lightweight, slim profile, and low power consumption. Accordingly, the LCD devices are widely used as monitors in electronic apparatuses, such as display panels for televisions.

Figure 1:
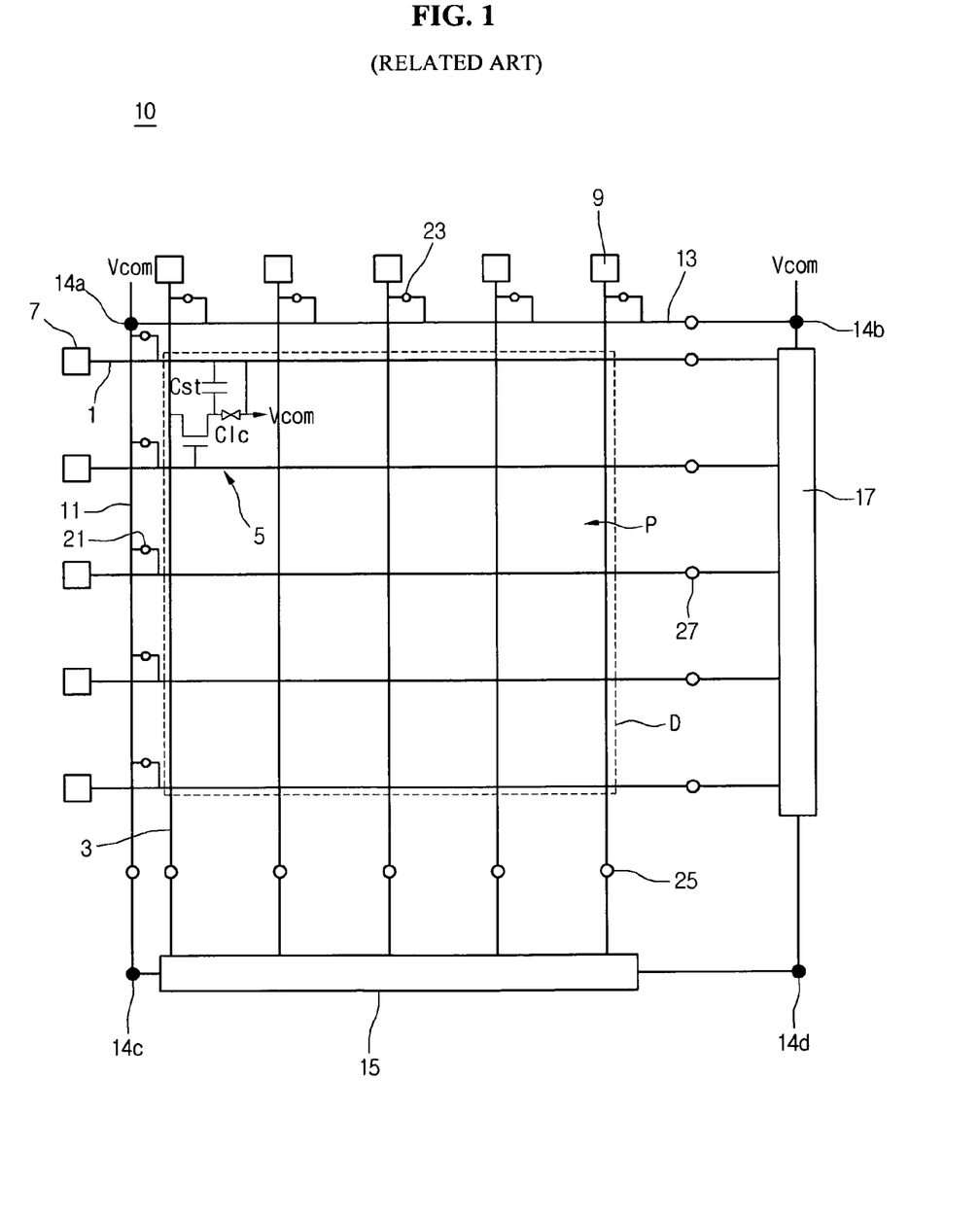
FIG. 1 is a schematic view of the related art LCD device.

FIG. 1 is a schematic view of the related art LCD device. Referring to FIG. 1, the general LCD device includes a layer of liquid crystal molecules (not shown) within a panel (not shown) having a first substrate 10 and a second substrate (not shown) facing each other. The a layer of liquid crystal molecules LC is interposed between the first substrate 10 and the second substrate (not shown). The first substrate 10 is divided into a display area D for displaying an image using a plurality of pixel regions P arranged in a matrix shape, and a non-display area, which is another region excluding the display area D.

A plurality of gate lines 1 and a plurality of data lines 3 are arranged to cross each other on the first substrate 10. The pixel regions P are defined by crossings of the gate lines 1 and the data lines 3. The gate lines 1 and the data lines 3 are formed in the non-display area as well as in the display area D. A gate pad 7 and a data pad 9 are connected at the end regions of the gate lines 1 and the data lines 3, respectively. The gate pad 7 and the data pad 9 receive signals from the outside.

Thin film transistors 5 are connected to the gate lines 1 and the data lines 3. Pixel electrodes (not shown) are connected to the thin film transistors 5. Each of the pixel regions P includes a thin film transistor 5 and a pixel electrode. Red, green, and blue color filters are formed on a second substrate to correspond to respective pixel regions P of the first substrate 10. A common electrode is formed on the color filters. In the case where the common electrode is formed on the second substrate, the liquid crystal panel can be a twisted nematic (TN) mode liquid crystal panel.

Liquid crystal capacitance Clc is formed by a portion of the layer of liquid crystal molecules disposed between the pixel electrode and the common electrode of a pixel region P. Storage capacitance Cst is formed by a predetermined insulating layer disposed between the pixel electrode and a gate line of a preceding pixel region.

A first common line 11 and a second common line 13, and a first dummy pad 15 and a second dummy pad 17 are arranged along side of the display area D outside of the non-display area. Ag dots 14a, 14b, 14c, and 14d for electrically connecting to a common electrode of the second substrate are formed between the common lines 11 and 13, or the common lines 11 and 13 and the dummy pads 15 and 17. A common voltage supplied to the common lines 11 and 13 can also be supplied to the common electrode of the second substrate via the Ag dots 14a, 14b, 14c, and 14d.

Electrostatic discharge (ESD) circuits 21, 23, 25, and 27 for preventing static electricity are formed between the gate line 1 and the first common line 11, between the data line 3 and the second common line 13, between the gate line 1 and the first dummy pad 17, and the data line 3 and the second dummy pad 15. The ESD circuits 21, 23, 25, and 27 cut off a high voltages from outside of the display area D so as to prevent devices of the display area D, such as the TFTs or the pixel electrodes, from being destroyed by the high voltages.

Figure 2:
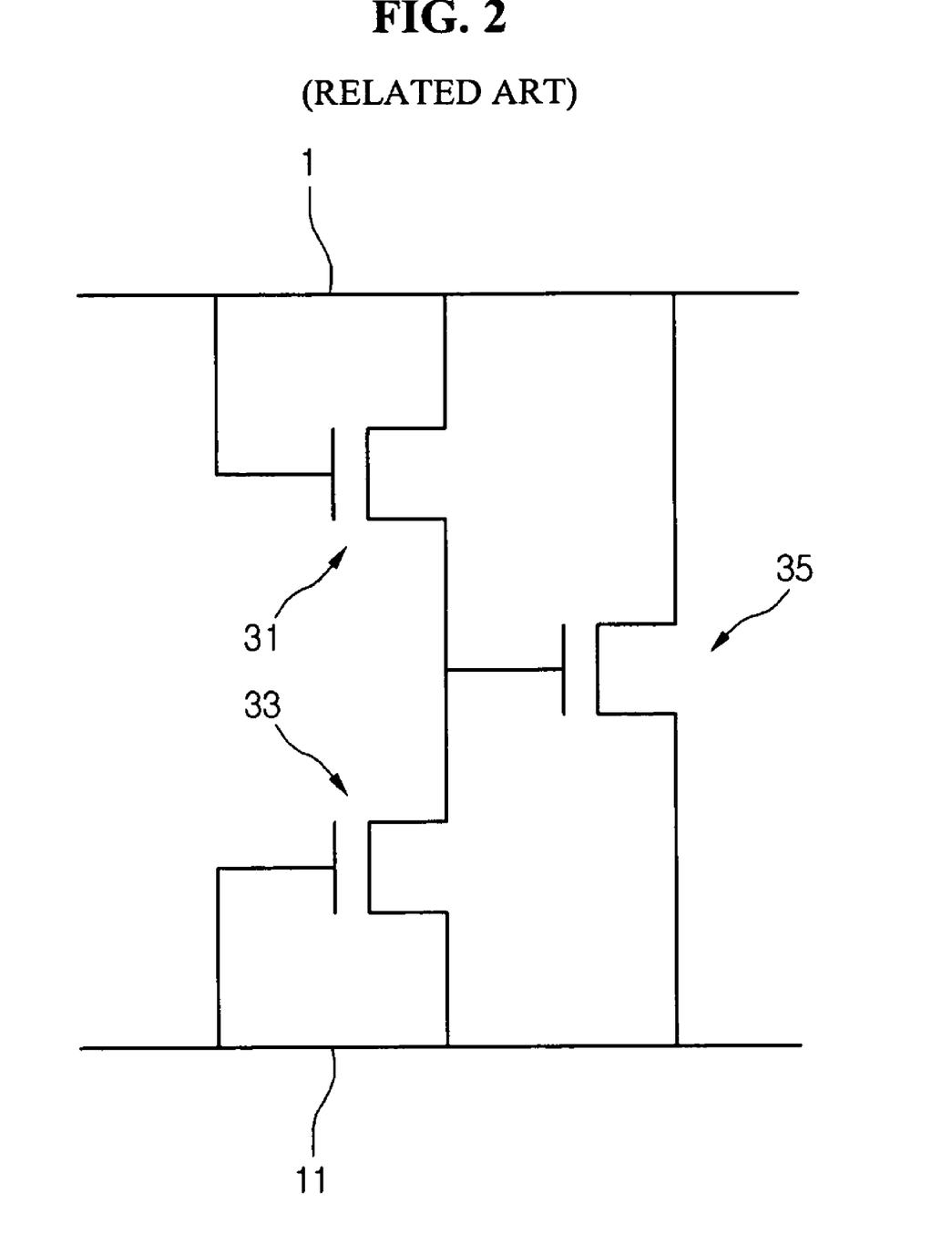
FIG. 2 is an equivalent circuit diagram of the ESD circuit in FIG. 1.

FIG. 2 is an equivalent circuit diagram of the ESD circuit in FIG. 1. Referring to FIG. 2, the ESD circuits 21, 23, 25, and 27 can include a first transistor to a third transistor 31, 33, and 35. Although FIG. 2 representatively illustrates an ESD circuit 21 formed between the gate line 1 and the first common line 11, the other EDS circuits 23, 25, and 27 also have the same structure as shown in FIG. 2. When static electricity of a high voltage is applied to the gate line 1 or the first common line 11, one of the first transistor 31 and the second transistor 33 is turned on by the high voltage. Accordingly, the high voltage that has been applied to the one of the transistors 31 and 32 subsequently turns on the third transistor 35. Therefore, static electricity that has flowed into the gate line 1 can be discharged to the first common line 11. On the other hand, static electricity that has flowed into the first common line 11 can be discharged to the gate line 1.

Generally, since the first to third transistors 31, 33, and 35 are designed to be turned on only by a high voltage, the first to third transistors 31, 33, and 35 maintain a turn-off state when a gate signal or a data voltage, which is a relatively low voltage compared to the high voltages of static electricity, is applied thereto. Accordingly, no leakage problems occur, such as gate signal leakage to the common line, that prevent driving of the LCD device. However, since the ESD circuit does generate some leakage current, power consumed for driving the LCD device is wasted. Also, since a signal for driving the pixel region P has losses caused by ESD leakage current, a desired brightness may not be obtained such that image quality suffers.

Such an ESD leakage current occurs in the ESD circuit 21 connected between the gate line 1 and the first common line 11. Typically, a relatively low gate low voltage is applied to the gate line 1 for a rest time, excluding a scanning portion of one frame period. Consequently, the gate low voltage is applied to the gate line 1 for most of the frame period. In this case, a potential difference of 10 V or more is generated between the gate low voltage and a common voltage applied to the first common line 11. Thus, a leakage current can flow through the third transistor 35 due to the potential difference. Therefore, an ESD circuit for minimizing leakage current is desirable.

SUMMARY OF THE INVENTION

Accordingly, embodiments of the invention is directed to an electrostatic discharge circuit and a liquid crystal display device having the same that substantially obviates one or more of the problems due to limitations and disadvantages of the related art.

An object of embodiments of the invention is to provide an ESD circuit for reducing power consumption and an LCD device having the same.

Another object of embodiments of the invention is to provide an ESD circuit for improving image quality and an LCD device having the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an electrostatic discharge circuit including: a first transistor and a second transistor connected between a first node and a second node in a first circulation loop, and a third transistor and a fourth transistor connected between the second node and a third node in a second circulation loop.

In another aspect of the invention, there is provided an electrostatic discharge circuit including: a plurality of first transistors and a plurality of second transistors connected between a first node and a second node in a first circulation loop, and a plurality of third transistors and a plurality of fourth transistors connected between the second node and a third node in a second circulation loop.

In another aspect of the invention, an electrostatic discharge circuit including: a plurality of first transistors and a singe second transistor connected between a first node and a second node in a first circulation loop, and a single third transistor and a plurality of fourth transistors connected between the second node and a third node in a second circulation loop In a still further another aspect of the invention, there is provided an electrostatic discharge circuit including: a single first transistor and a plurality of second transistors connected between a first node and a second node in a first circulation loop, and a plurality of third transistors and a single fourth transistor connected between the second node and a third node in a second circulation loop.

In another aspect of the invention, there is provided a liquid crystal display device including: a liquid crystal panel divided into a display region and a non-display region, a plurality of gate lines and data lines arranged to cross each other on the display region, a first common line and a second common line arranged in parallel to the data lines and the gate lines, respectively, on the non-display region, and a plurality of electrostatic discharge circuits connected between the gate lines and the first common line, and between the data lines and the second common line, wherein each of the plurality of electrostatic discharge circuits has a first transistor and a second transistor connected between a first node and a second node in a first circulation loop, and a third transistor and a fourth transistor connected between the second node and a third node in a second circulation loop.

It is to be understood that both the foregoing general description and the following detailed description of embodiments of the invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the invention, examples of which are illustrated in the accompanying drawings.

Figure 3:
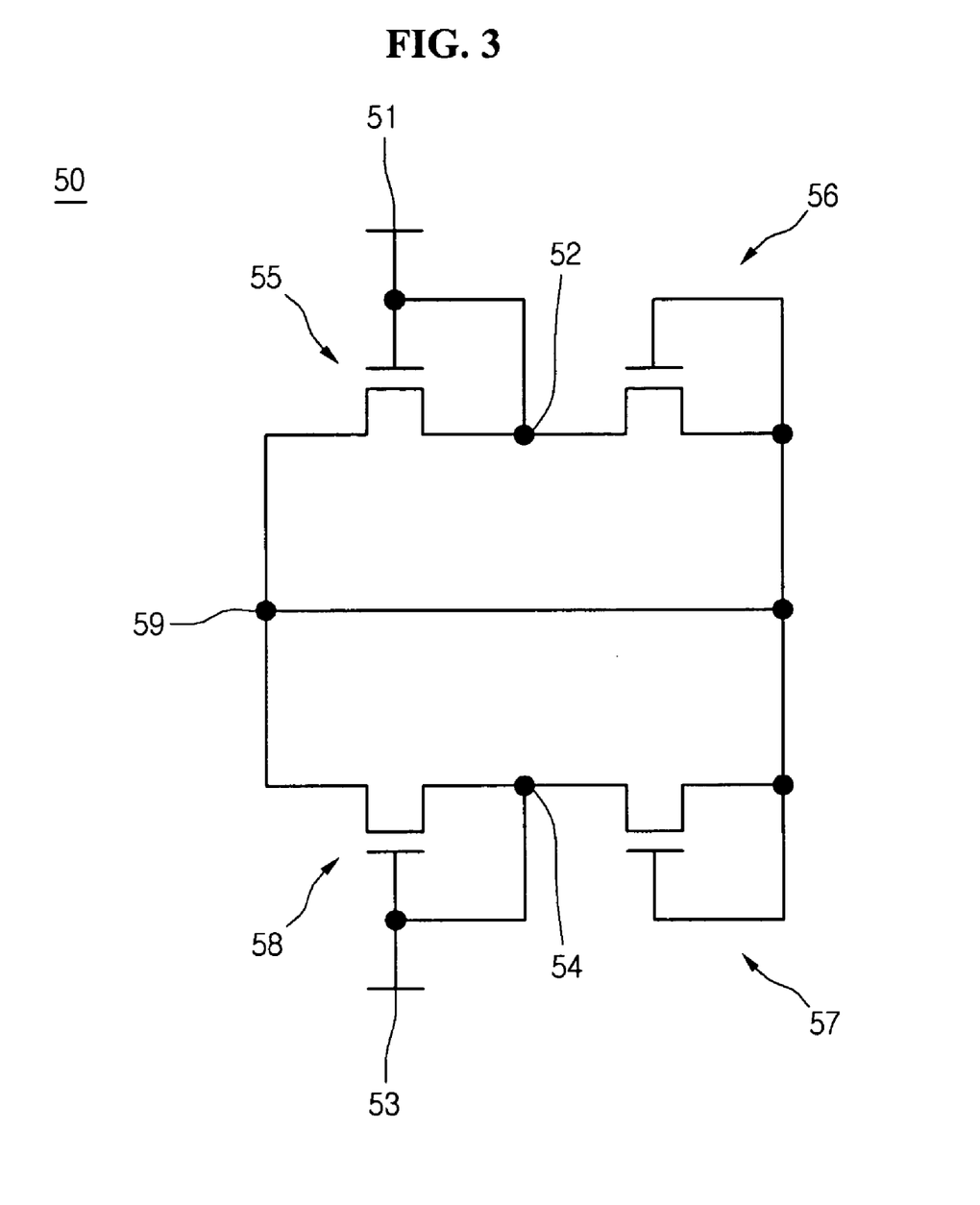
FIG. 3 is a view of an ESD circuit according to a first embodiment of the invention.
Figure 4:
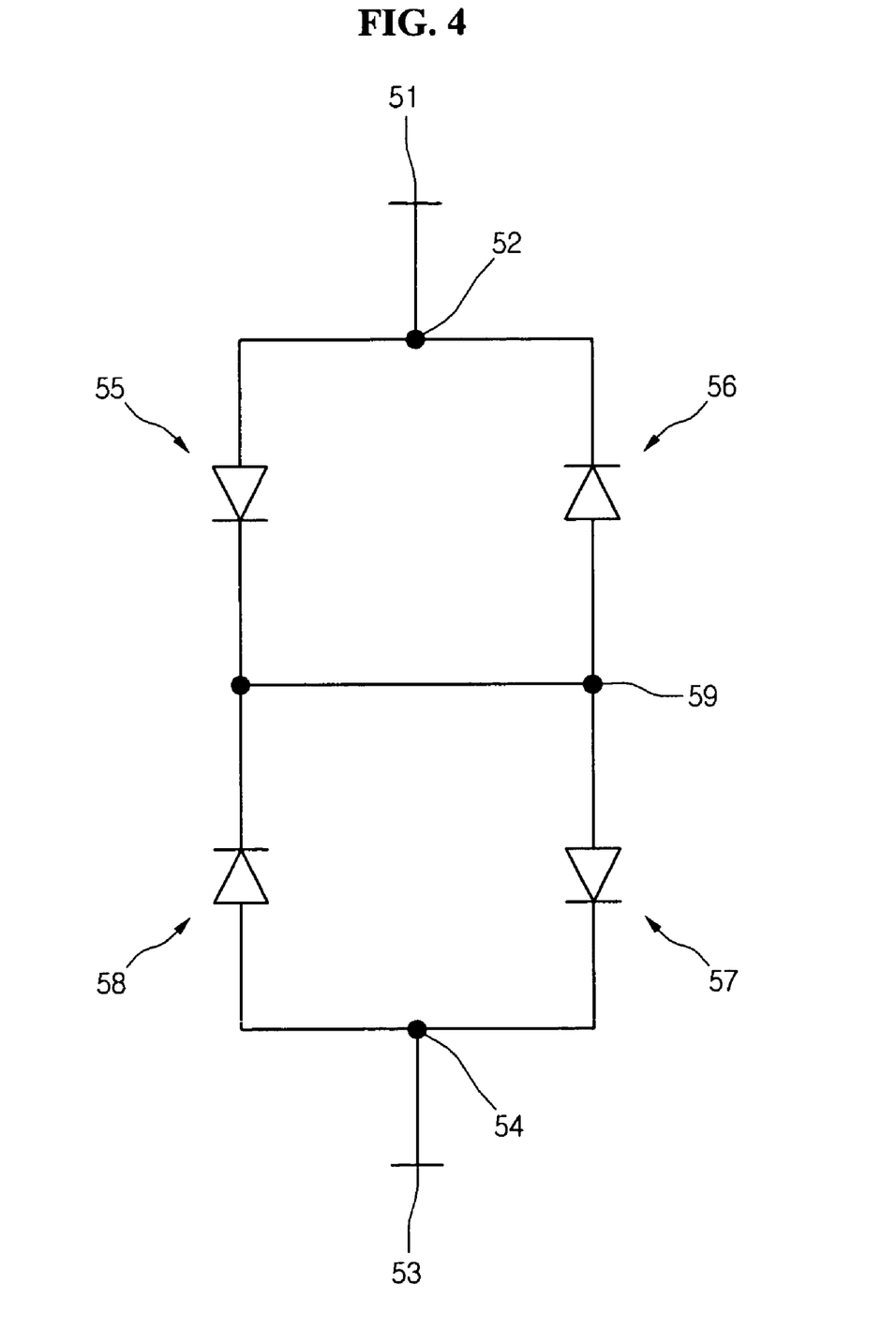
FIG. 4 is an equivalent circuit diagram of the ESD circuit in FIG. 3.

FIG. 3 is a view of an ESD circuit according to a first embodiment of the invention, and FIG. 4 is an equivalent circuit diagram of the ESD circuit in FIG. 3. Referring to FIGS. 3 and 4, the ESD circuit 50 includes a first forward transistor 55 and a first reverse transistor 56 connected between a first node 52 and a second node 59, and a second forward transistor 57 and a second reverse transistor 58 connected between the second node 59 and a third node 54. The first node 52 is connected to a first terminal 51, and the third node 54 is connected to a second terminal 53.

The first forward transistor 55 and the first reverse transistor 56 constitute a circulation loop between the first and second nodes 52 and 59. The second forward transistor 57 and the second reverse transistor 58 constitute another circulation loop between the second and third nodes 59 and 54. The first and second forward transistors 55 and 57, and the first and second reverse transistors 56 and 58 can be diode type transistors.

The first forward transistor 55 includes a gate and a source connected in common to the first node 52, and a drain connected to the second node 59. The first reverse transistor 56 includes a gate and a source connected in common to the second node 59, and a drain connected to the second node 52. The second forward transistor 57 includes a gate and a source connected in common to the second node 59, and a drain connected to the third node 54. The second reverse transistor 58 includes a gate and a source connected in common to the third node 54, and a drain connected to the second node 59.

When a high voltage, such as static electricity, is applied to the first terminal 51, the high voltage is sequentially applied to the first node 52, the first forward transistor 55, the second node 59, the second forward transistor 57, and the third node 54, and then discharged to the second terminal 53. On the other hand, when a high voltage is applied to the second terminal 53, the high voltage is sequentially applied to the third node 54, the second reverse transistor 58, the second node 59, the first reverse transistor 56, and the first node 52, and then discharged to the first terminal 51. In the ESD circuit 50, none of the transistors 55 to 58 are turned on by a low voltage.

FIG. 4 is an equivalent circuit diagram of the ESD circuit in FIG. 3. As shown in FIG. 4, each of the transistors 55 to 58 is a diode type transistor, which has a predetermined internal resistance. Therefore, leakage current is limited by the internal resistance of the each of the transistors 55 to 58, so that the leakage current can be minimized.

Figure 5:
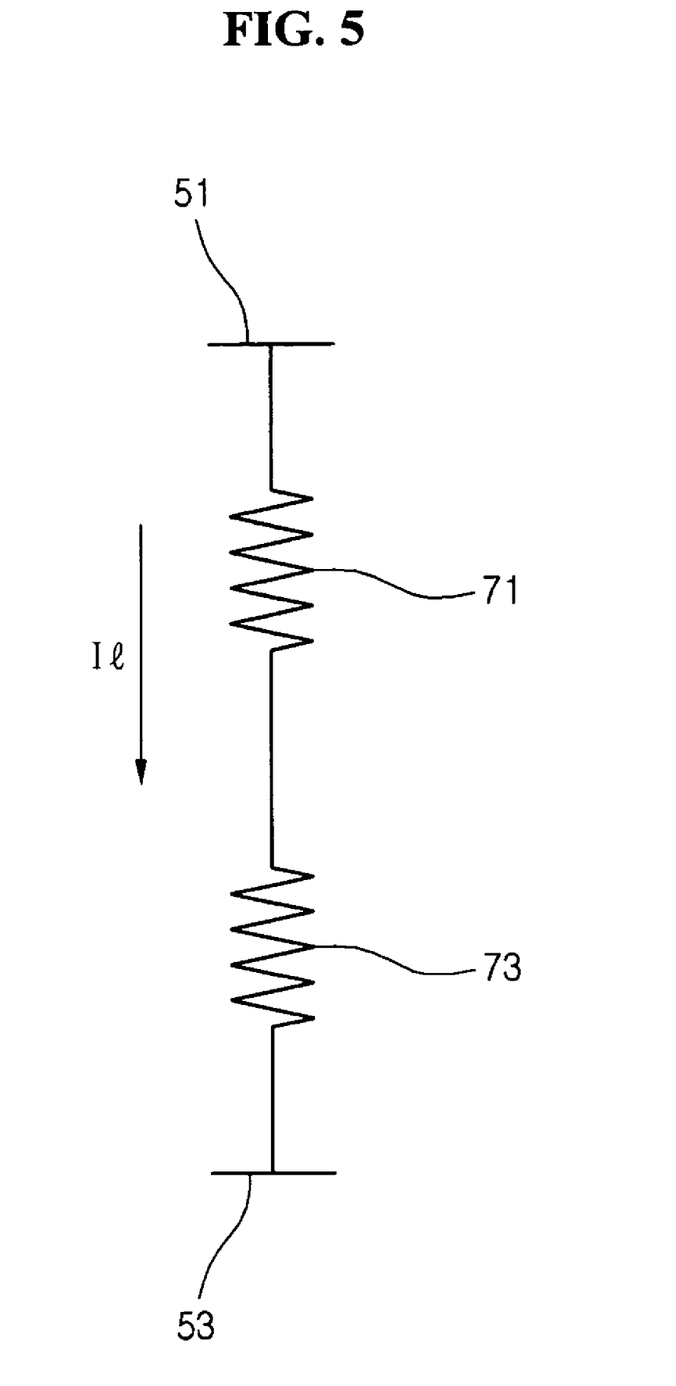
FIG. 5 is a view illustrating an equivalent circuit diagram for minimizing leakage current of the ESD circuit in FIG. 3.

FIG. 5 is a view illustrating an equivalent circuit diagram for minimizing leakage current of the ESD circuit in FIG. 3. As shown in FIG. 5, when a relatively high voltage is applied to the first terminal 51 compared to the second terminal 53, a leakage current I1 from the first terminal 51 can sequentially flow through the first and second forward transistors 55 and 57, and the second terminal 53. However, since resistors 71 and 73 exist in the first and second forward transistors 55 and 57, the leakage current I1 is limited by these resistors 71 and 73. Consequently, the leakage current I1 is minimized. In short, a leakage current can be reduced in an inverse proportion to the number of diode type transistors.

Figure 6:
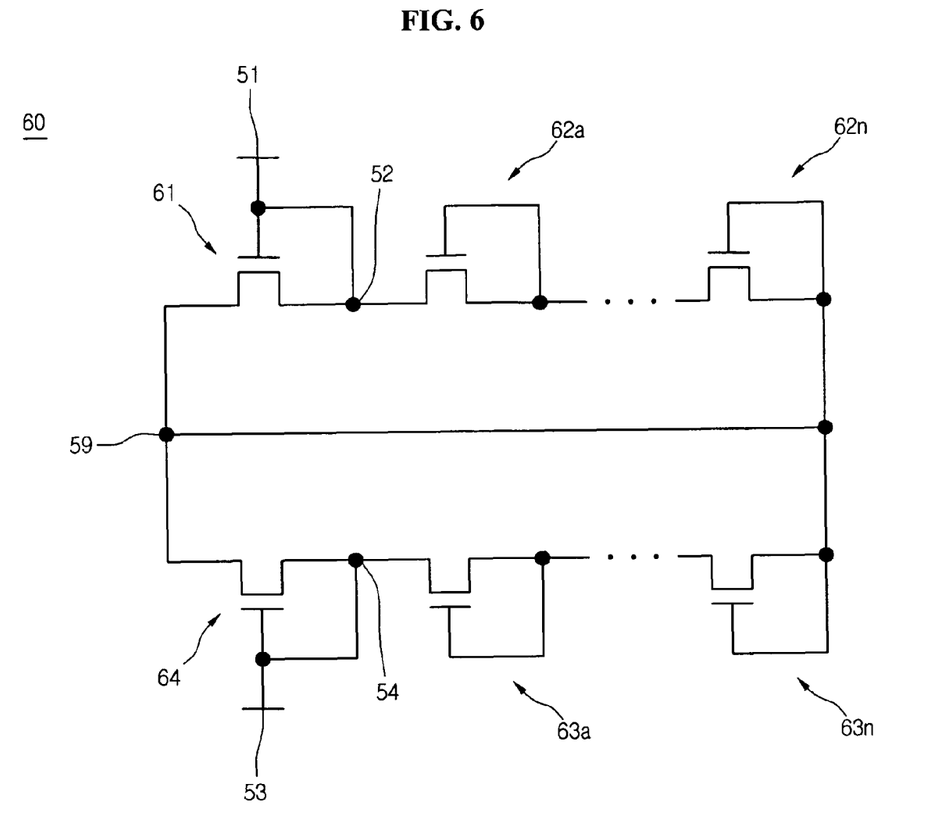
FIG. 6 is a view of an ESD circuit according to a second embodiment of the invention.
Figure 7:
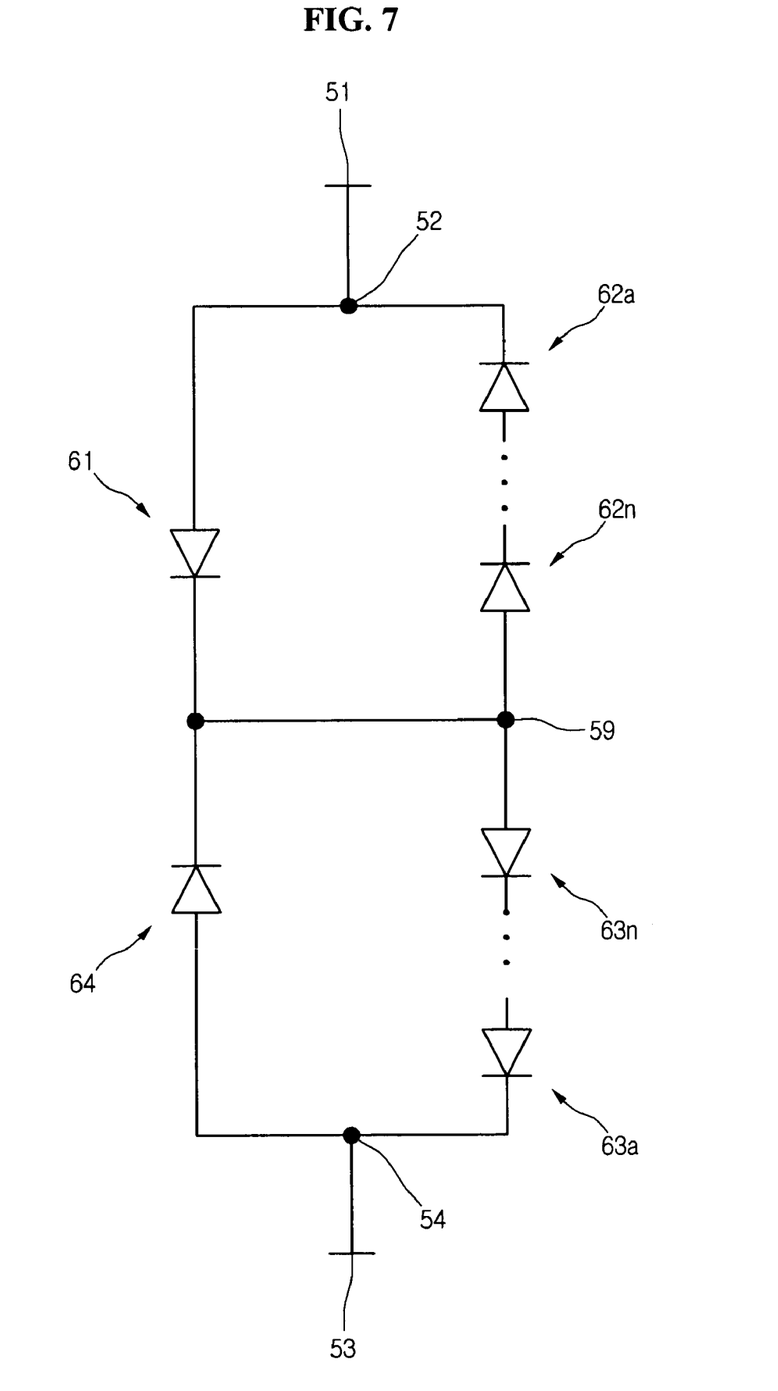
FIG. 7 is an equivalent circuit diagram of the ESD circuit in FIG. 6.

FIG. 6 is a view of an ESD circuit according to a second embodiment of the invention, and FIG. 7 is an equivalent circuit diagram of the ESD circuit in FIG. 6. Referring to FIGS. 6 and 7, the ESD circuit 60 includes a first forward transistor 61 and a plurality of first reverse transistors 62a, 62b, . . . and 62n connected between a first node 52 and a second node 59, and a plurality of second forward transistors 63a, 63b, . . . and 63n, and a second reverse transistor 64 connected between the second node 59 and a third node 54. The first node 52 is connected to a first terminal 51, and the third node 54 is connected to a second terminal 53. The first forward transistor 61 and the plurality of first reverse transistors 62a, 62b, . . . and 62n constitute a circulation loop between the first and second nodes 52 and 59. The plurality of second forward transistors 63a, 63b, . . . and 63n, and the second reverse transistor 64 constitute anther loop between the second and third nodes 59 and 54.

The first forward transistor 61, the plurality of second forward transistors 63a, 63b, . . . and 63n, the plurality of first reverse transistors 62a, 62b, . . . and 62n, and the second reverse transistor 64 can be diode type transistors. The first forward transistor 61 includes a gate and a source connected in common to the first node 52, and a drain connected to the second node 59. The first reverse transistors 62a, 62b, . . . and 62n are series-connected to each other. More particularly, a gate and a source of the first reverse transistor 62a located at a first position are connected to a drain of the first reversion transistor 62b located at a second position, and a drain of the first reverse transistor 62a located at the first position is connected to the first node 52. Also, a gate and a source of the first reverse transistor 62n located at a last position are connected to the second node 59, and a drain of the first reverse transistor 62n located at the last position is connected to the first reverse transistor 62n-1 located at a last former position.

The plurality of second forward transistors 63a, 63b, . . . and 63n are series-connected to each other. More particularly, a gate and a source of the second forward transistor 63a located at a first position are connected to a drain of the second forward transistor 63b located at a second position, and a drain of the second forward transistor 63a located at the first position is connected to the third node 54. Also, a gate and a source of the second forward transistor 63n located at a last position are connected to the second node 59, and a drain of the second forward transistor 63n located at the last position is connected to the second forward transistor 63n-1 located at a last former position. The second reverse transistor 64 includes a gate and a source connected in common to the third node 54, and a drain connected to the second node 59.

When a high voltage, such as static electricity, is applied to the first terminal 51, the high voltage is sequentially applied to the first node 52, the first forward transistor 61, the second node 59, the plurality of second forward transistors 63a, 63b, . . . and 63n in series, and the third node 54, and then discharged to the second terminal 53. On the other hand, when a high voltage is applied to the second terminal 53, the high voltage is sequentially applied to the third node 54, the second reverse transistor 64, the second node 59, the plurality of first reverse transistors 62a, 62b, . . . and 62n, and the first node 52, and then discharged to the first terminal 51. In the ESD circuit 60, none of the transistors 61, 62a, 62b, . . . , 62n, 63a, 63b, . . . , 63n, and 64 are turned on by a low voltage.

In the ESD circuit 60, each of the transistors 61, 62a, 62b, . . . ,62n, 63a, 63b, . . . , 63n, and 64 is a diode type transistor and has a predetermined internal resistance. Therefore, leakage current is limited by the internal resistance of the each of the transistors 61, 62a, 62b, . . . ,62n, 63a, 63b, . . . , 63n, and 64, so that the leakage current can be minimized. Therefore, since resistance increases in proportion to the number of the diode type transistors, a leakage current can be further minimized.

Besides the above-described embodiments, a variety of other embodiments can be implemented. An ESD circuit according to a third embodiment of the invention can include a plurality of first forward transistors in series and a first reverse transistor connected between a first node and a second node, and a second forward transistor and a plurality of second reverse transistors in series connected between the second node and a third node. Each of the transistors can be a diode type transistor. The first forward transistors and the first reverse transistor constitute a circulation loop between the first and second nodes. The second forward transistor and the second reverse transistors constitute another circulation loop between the second and third nodes.

An ESD circuit according to a fourth embodiment of the invention can include a plurality of first forward transistors and a plurality of first reverse transistors in series connected between a first node and a second node, and a plurality of second forward transistors and a plurality of second reverse transistors in series connected between the second node and a third node. Each of the transistors can be a diode type transistor. The first forward transistors and the first reverse transistors constitute a circulation loop between the first and second nodes. The second forward transistors and the second reverse transistors constitute another circulation loop between the second and third nodes. As described above, according to embodiments of the invention, a diode type transistor is provided to minimize a leakage current, so that power consumption is reduced and image quality can be improved.

It will be apparent to those skilled in the art that various modifications and variations can be made in the electrostatic discharge circuit and a liquid crystal display device having the same of embodiments of the invention without departing from the spirit or scope of the invention. Thus, it is intended that embodiments of the invention cover the modifications and variations of this invention provided they come within the scope of the appended claims and their equivalents.

What is claimed is:

1. An electrostatic discharge circuit, comprising:
a plurality of first transistors and a plurality of second transistors connected between a first node and a second node in a first circulation loop; and
a plurality of third transistors and a plurality of fourth transistors connected between the second node and a third node in a second circulation loop,
wherein the leakage current of the circuit is blocked by the resistance of each of the first to fourth transistors,
wherein the first transistors are series-connected to each other, the second transistors are series-connected to each other, the third transistors are series-connected to each other, and the fourth transistors are series-connected to each other,
wherein one of the plurality of first transistors includes a gate and a source connected in common to the first node, and a drain connected the second node,
wherein a gate and a source of the second transistor located at a first position are connected to a drain of one of the plurality of second transistors located at a second position,
wherein one of the plurality of third transistors includes a gate and a source connected in common to the third node, and a drain connected to the second node,
wherein a gate and a source of one of the plurality of fourth transistors located at a first position are connected to a drain of one of the plurality of fourth transistors located at a second position, and
wherein each of the first, second, third, and fourth transistors has a particular predetermined forward-biased internal resistance.

2. The electrostatic discharge circuit according to claim 1, wherein the plurality of first transistors are forward transistors and the plurality of second transistors are reverse transistors.

3. The electrostatic discharge circuit according to claim 1, wherein the plurality of first transistors are reverse transistors and the plurality of second transistors are forward transistors.

4. The electrostatic discharge circuit according to claim 1, wherein the plurality of third transistors are forward transistors and the plurality of fourth transistors are reverse transistors.

5. The electrostatic discharge circuit according to claim 1, wherein the plurality of third transistors are reverse transistors and the plurality of fourth transistors are forward transistors.

6. The electrostatic discharge circuit according to claim 1, wherein the first to fourth transistors are diode type transistors.

7. An electrostatic discharge circuit, comprising:
a plurality of first transistors and a single second transistor connected between a first node and a second node in a first circulation loop; and
a single third transistor and a plurality of fourth transistors connected between the second node and a third node in a second circulation loop,
wherein the leakage current of the circuit is blocked by the resistance of each of the first to fourth transistors,
wherein the first transistors are series-connected to each other, and the fourth transistors are series-connected to each other,
wherein one of the plurality of first transistors includes a gate and a source connected in common to the first node, and a drain connected the second node,
wherein the second transistor includes a gate and source connected in common to the second node, and a drain connected the first node,
wherein the third transistor includes a gate and a source connected in common to the third node, and a drain connected to the second node,
wherein one of the plurality of fourth transistors includes a gate and source connected in common to the second node, and drain connected to the third node, and
wherein each of the first, second, third, and fourth transistors has a particular predetermined forward-biased internal resistance.

8. The electrostatic discharge circuit according to claim 7, wherein the plurality of first transistors are forward transistors and the singe second transistor is a reverse transistor.

9. The electrostatic discharge circuit according to claim 7, wherein the plurality of first transistors are reverse transistors, and the singe second transistor is a forward transistor.

10. The electrostatic discharge circuit according to claim 7, wherein the single third transistor is a forward transistor and the plurality of fourth transistors are reverse transistors.

11. The electrostatic discharge circuit according to claim 7, wherein the single third transistor is a reverse transistor and the plurality of fourth transistors are forward transistors.

12. The electrostatic discharge circuit according to claim 7, wherein the first to fourth transistors are diode type transistors.

13. An electrostatic discharge circuit, comprising:
a single first transistor and a plurality of second transistors connected between a first node and a second node in a first circulation loop; and
a plurality of third transistors and a single fourth transistor connected between the second node and a third node in a second circulation loop,
wherein the leakage current of the circuit is blocked by the resistance of each of the first to fourth transistors,
wherein the second transistors are series-connected to each other, and the third transistors are series-connected to each other,
wherein the first transistor includes a gate and a source connected in common to the first node, and a drain connected the second node,
wherein a gate and a source of one of the plurality of second transistors located at a first position are connected to a drain of the second transistor located at a second position,
wherein a gate and a source of one of the plurality of third transistors located at a first position are connected to a drain of the third transistor located at a second position,
wherein the fourth transistor includes a gate and a source connected in common to the third node, and a drain connected to the second node, and
wherein each of the first, second, third, and fourth transistors has a particular predetermined forward-biased internal resistance.

14. The electrostatic discharge circuit according to claim 13, wherein the single first transistor is a forward transistor and the plurality of second transistors are reverse transistors.

15. The electrostatic discharge circuit according to claim 13, wherein the single first transistor is a reverse transistor and the plurality of second transistors are forward transistors.

16. The electrostatic discharge circuit according to claim 13, wherein the plurality of third transistors are forward transistors and the single fourth transistor is a reverse transistor.

17. The electrostatic discharge circuit according to claim 13, wherein the plurality of third transistors are reverse transistors and the single fourth transistor is a forward transistor.

18. The electrostatic discharge circuit according to claim 13, wherein the first to fourth transistors are diode type transistors.

19. A liquid crystal display device, comprising:
a liquid crystal panel divided into a display region and a non-display region;
a plurality of gate lines and data lines arranged to cross each other on the display region;
a first common line and a second common line arranged in parallel to the data lines and the gate lines, respectively, on the non-display region; and a plurality of electrostatic discharge circuits connected between the gate lines and the first common line, and between the data lines and the second common line, wherein each of the plurality of electrostatic discharge circuits has a first transistor and a plurality of second transistors connected between a first node and a second node in a first circulation loop, and a plurality of third transistors and a fourth transistor connected between the second node and a third node in a second circulation loop, wherein the leakage current of the circuit is blocked by the resistance of each of the first to fourth transistors, wherein a plurality of the electrostatic discharge circuits connected between the gate lines and the first common line, and between the data lines and the second common line, wherein the first transistor includes a gate and a source connected in common to the first node, and a drain connected the second node, wherein a gate and a source of one of the plurality of second transistors located at a first position are connected to a drain of the first transistor located at a second position, wherein a gate and a source of one of the plurality of third transistors located at a first position are connected to a drain of the third transistor located at a second position, wherein the fourth transistor includes a gate and a source connected in common to the third node, and a drain connected to the second node, and wherein each of the first, second, third, and fourth transistors has a particular predetermined forward-biased internal resistance.

20. The liquid crystal display device according to claim 19, wherein the first transistor is a forward transistor and the second transistor is a reverse transistor.

21. The liquid crystal display device according to claim 19, wherein the first transistor is a reverse transistor and the second transistor is a forward transistor.

22. The liquid crystal display device according to claim 19, wherein the third transistor is a forward transistor and the fourth transistor is a reverse transistor.

23. The liquid crystal display device according to claim 19, wherein the third transistor is a reverse transistor and the fourth transistor is a forward transistor.

24. The liquid crystal display device according to claim 19, wherein the first to fourth transistors are diode type transistors.

25. The liquid crystal display device according to claim 19, wherein the first transistor is a plurality of transistors in series.

26. The liquid crystal display device according to claim 19, wherein the second transistor is a plurality of transistors in series.

27. The liquid crystal display device according to claim 19, wherein the third transistor is a plurality of transistors in series.

28. The liquid crystal display device according to claim 19, wherein the fourth transistor a plurality of transistors in series.

* * * * *